United States Patent
Hirai et al.

(10) Patent No.: US 12,340,228 B2
(45) Date of Patent: Jun. 24, 2025

(54) INFORMATION PROCESSING TERMINAL AND SENSING SYSTEM

(71) Applicant: Hitachi, Ltd., Tokyo (JP)

(72) Inventors: Riu Hirai, Tokyo (JP); Keiki Nakamura, Yokohama (JP); Tasuku Shimada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 70 days.

(21) Appl. No.: 18/033,569

(22) PCT Filed: Oct. 20, 2021

(86) PCT No.: PCT/JP2021/038837
§ 371 (c)(1),
(2) Date: Apr. 25, 2023

(87) PCT Pub. No.: WO2022/091917
PCT Pub. Date: May 5, 2022

(65) Prior Publication Data
US 2023/0401071 A1    Dec. 14, 2023

(30) Foreign Application Priority Data
Oct. 28, 2020    (JP) .................................. 2020-180072

(51) Int. Cl.
| | | |
|---|---|---|
| *G06F 9/00* | (2018.01) | |
| *G06F 9/4401* | (2018.01) | |
| *G06F 15/177* | (2006.01) | |

(52) U.S. Cl.
CPC .................................. *G06F 9/4401* (2013.01)

(58) Field of Classification Search
CPC ..................................................... G06F 9/4401
See application file for complete search history.

(56) References Cited

U.S. PATENT DOCUMENTS

| | | | |
|---|---|---|---|
| 2004/0078655 A1* | 4/2004 | Sung | G06F 1/30 714/14 |
| 2012/0238846 A1* | 9/2012 | Myers | A61B 5/14551 600/324 |

(Continued)

FOREIGN PATENT DOCUMENTS

| | | | | |
|---|---|---|---|---|
| JP | 2017084123 A | * | 5/2017 | ............ G06F 9/06 |
| WO | 2018-002610 A1 | | 1/2018 | |

OTHER PUBLICATIONS

International Search Report dated Jan. 12, 2022 for PCT International Application No. PCT/JP2021/038837.

(Continued)

*Primary Examiner* — Mohammed H Rehman
(74) *Attorney, Agent, or Firm* — Volpe Koenig

(57) ABSTRACT

An information processing terminal includes a processor, a memory, a communication unit, a container reception module, a container execution module and a sensor. The container reception module receives a container image via the communication unit. The container execution module boots the container when the container image is received and executes the application contained in the container image. The container boots the application based on the recognition situation about the sensor is recognized. The application executes a predetermined processing for sensing data acquired from the sensor.

5 Claims, 11 Drawing Sheets

(56) References Cited

U.S. PATENT DOCUMENTS

| | | | |
|---|---|---|---|
| 2013/0120302 A1* | 5/2013 | Kang | G06F 3/0483 |
| | | | 345/173 |
| 2017/0078610 A1* | 3/2017 | Yang | G06F 3/016 |
| 2017/0185418 A1* | 6/2017 | Huang | G06F 8/654 |
| 2018/0253317 A1* | 9/2018 | Pan | G06F 9/4416 |
| 2019/0195184 A1 | 6/2019 | Pereira De Oliveira | |

OTHER PUBLICATIONS

Ogata et al., "Study of Edge Integration technology", The Papers of Technical Meeting on "Communications", IEE Japan, Jan. 30, 2020, pp. 41-44.

\* cited by examiner

INFORMATION PROCESSING TERMINAL AND SENSING SYSTEM

CLAIM OF PRIORITY

The present application claims priority from Japanese patent application JP 2020-180072 filed on Oct. 28, 2020, the content of which is hereby incorporated by reference into this application.

BACKGROUND

This invention relates to a sensing system in which processing of sensors is executed on a plurality of information processing terminals.

As a sensing system that visualizes an operation status or the like of a factory, a work site, or a similar place, there has hitherto been known a server-based computing configuration in which images collected from a plurality of network cameras are processed by a high-performance server.

In order to monitor various situations with the server-based computing configuration, a larger number of cameras are required. An increase in number of cameras in the server-based computing configuration leads to increased processing load on the server as well as, among others, an increased hardware cost of the network cameras, and is accordingly a solution adoptable by large-scale corporations and the like.

In recent years, there have been demands for the sensing system that visualizes the operation status or the like of a factory or a similar place in small and medium-sized businesses as well, and an inexpensive solution is wanted. Another development of recent years is growing popularization of an inexpensive and small-sized information processing terminal which adopts an inexpensive System on a Chip (SoC) and which is capable of, for example, recognition of sensing data by including a central processing unit (CPU), a graphics processing unit (GPU), and a universal serial bus (USB) I/O interface or a different I/O interface.

An application running on an SoC can be reduced in processing load on the server side by utilizing a container distribution technology to execute distributed processing on a large number of inexpensive information processing terminals. As the container distribution technologies, WO 2018/020610 A1, for example, is known.

SUMMARY

When an information processing terminal using an SoC receives a container image file distributed from a management computer with use of the container distribution technology to process sensing data of a sensor coupled to an I/O interface of the information processing terminal, a container is booted on the information processing terminal side after an OS of the information processing terminal is booted.

The booted OS of the information processing terminal recognizes the sensor coupled to the I/O interface, and then generates a device file of the sensor. An application booted on the container of the information processing terminal acquires the generated device file to acquire the sensing data of the sensor.

How long it takes for the OS of the information processing terminal to recognize the sensor coupled to the I/O interface and generate the device file varies depending on a type, a manufacturer, and the like of the sensor. In a case in which a USB interface is used as the I/O interface, in particular, an inexpensive sensor is usable but a length of time until the generation of the device file greatly varies depending on the manufacturer and the type of the sensor.

However, with the related art as described above, timing of booting the OS of the information processing terminal and timing of booting the container are not considered, and the application in the container is accordingly started before the device file of the sensor coupled to the I/O interface is generated in some cases.

When this happens, the application in the container cannot acquire the device file and, consequently, fails to recognize the sensor and acquire the sensing data, which results in a problem in that the processing of the sensing data cannot be executed.

Some sensing systems have a self-healing or automatic healing function which boots a watchdog installed in an application in a container when there is a trouble with processing of the application, and accordingly have a problem in that a reboot loop occurs unless the timing of generating the device file is taken into consideration.

In a case in which state management of the sensor coupled by USB connection and of the information processing terminal is executed on the management computer side, an administrator or another person operating the management computer is required to collect information of the sensor and the OS on the information processing terminal side in advance because the length of time from the recognition of the sensor to the generation of the device file by the OS varies depending on the type and the manufacturer of the sensor. A problem in this case is that a trouble of collecting information of sensors installed at factories, job sites, or similar places on the management computer side each time the sensors are replaced raises a cost of managing the large numbers of sensors and information processing terminals.

This invention has been made in view of the problem described above, and it is accordingly an object of this invention to offload state management of a sensor coupled to an I/O interface of an information processing terminal to the information processing terminal side.

According to one aspect of the present invention, an information processing terminal includes a processor, a memory, a communication unit, a container reception module, a container execution module and a sensor. The container reception module receives a container image via the communication unit. The container execution module boots the container when the container image is received and executes the application contained in the container image. The container boots the application based on the recognition situation about the sensor is recognized. The application executes a predetermined processing for sensing data acquired from the sensor.

This invention accordingly enables the offloading of the state management of the sensor coupled to the information processing terminal (an edge terminal) to the information processing terminal. A management computer is thus freed of management of the sensor on the information processing terminal side, and a cost of introducing and running a sensing system can accordingly be reduced.

The details of at least one embodiment of a subject matter disclosed herein are set forth in the accompanying drawings and the following description. Other features, aspects, and effects of the disclosed subject matter become apparent from the following disclosure, drawings, and claims.

DETAILED DESCRIPTION OF THE PREFERRED EMBODIMENTS

Now, embodiments of this invention are described with reference to the accompanying drawings.

First Embodiment

Figure 1:
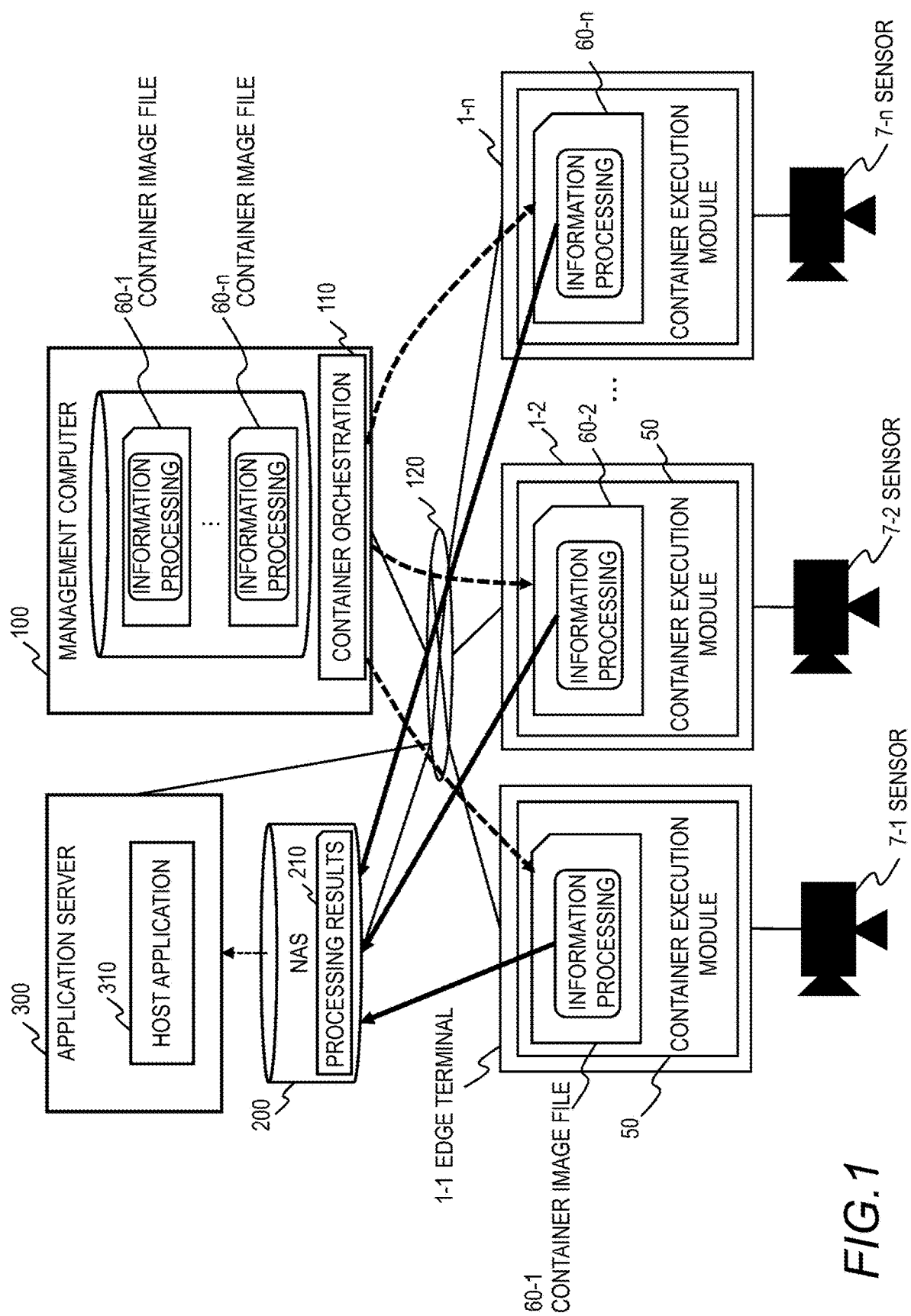
FIG. 1 is illustration of a first embodiment of this invention in the form of a block diagram for illustrating an outline of a sensing system.

FIG. 1 is illustration of a first embodiment of this invention in the form of a block diagram for illustrating an outline of a sensing system. The sensing system according to the first embodiment is described taking as an example a case in which sensors 7-1 to 7-$n$ are installed in factories or similar places to detect an operation status of a device or the like, pieces of information detected by the sensors 7-1 to 7-$n$ are collected by edge terminals (information processing terminals) 1-1 to 1-$n$, respectively, and the operation status of each of the factories or similar places is analyzed on an application server 300. In the following description, when the edge terminals are not individually specified, a reference symbol "1" obtained by omitting "-" and the subsequent numeral or alphabet letter is used. The same applies also to reference symbols of other components.

The sensors 7 are coupled to the edge terminals 1, and the edge terminals 1 are coupled to a management computer 100, the application server 300, and a network-attached storage (NAS) 200 via a network 120.

The management computer 100 executes a container orchestration 110 in which information processing executed on the edge terminals 1 is managed as container image files 60-1 to 60-$n$, and the container image files 60 are distributed to the respective edge terminals 1. The management computer 100 generates, as the container image files 60, information processing that varies depending on a type or the like of the sensors 7 of the edge terminals 1 by combining applications and AI models in advance, and distributes the container image files 60 to the edge terminals 1 at predetermined timing.

Each of the edge terminals 1 include a container execution module 50 which executes one of the container image files 60 that is received, in order to boot a container to execute an application in the received container image file 60.

The container image files 60 in the first embodiment include applications for acquiring information from the sensors 7 and causing the AI models to recognize the information and monitoring modules which monitor states (generation of device files) of the sensors 7, as described later. An example of the sensors 7 is cameras. The AI models recognize images from the cameras, and applications of the edge terminals 1 store results of the recognition in processing results 210 of the NAS 200. The application server 300 acquires the processing results 210 of the NAS 200 to execute a predetermined analysis.

Figure 2:
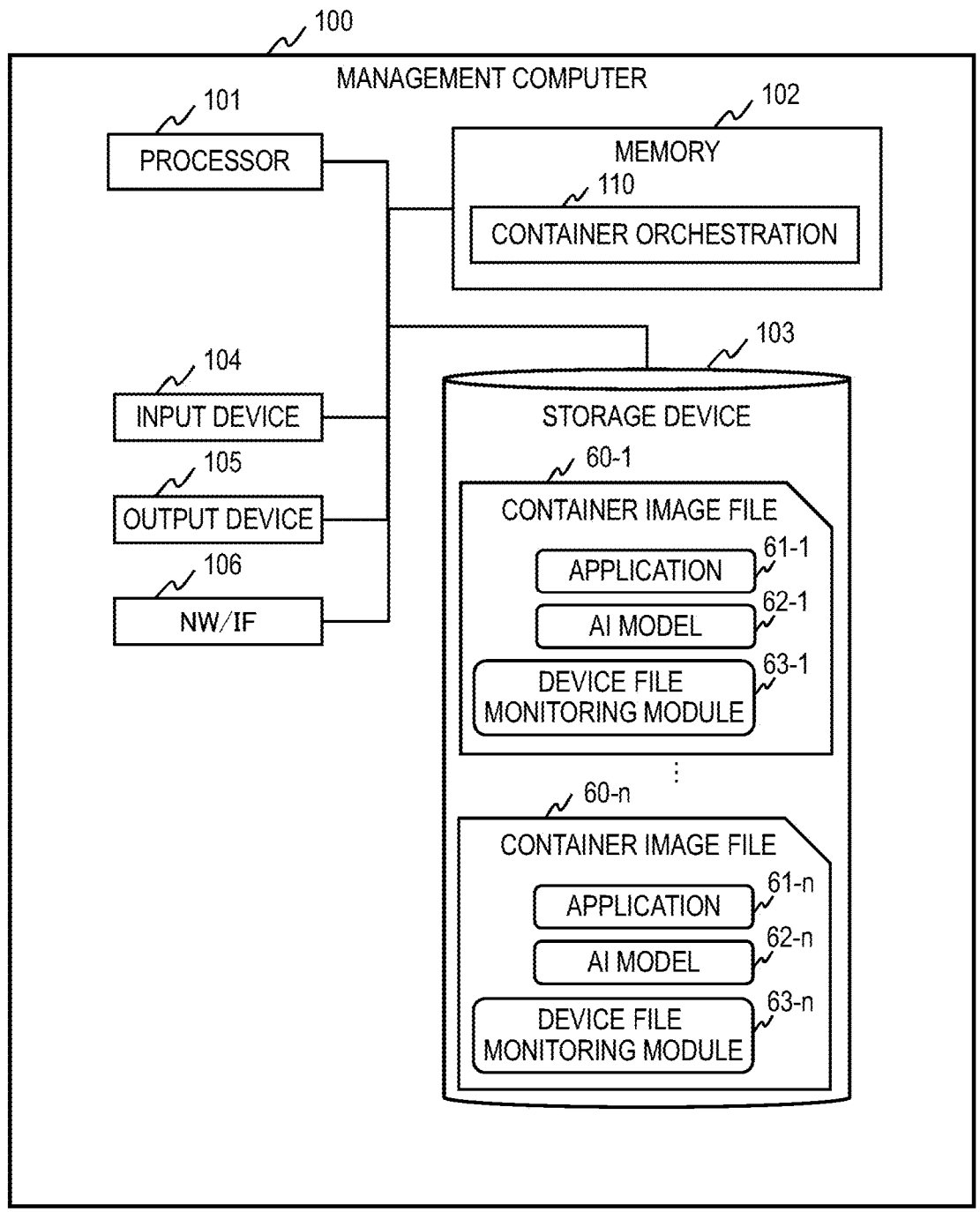
FIG. 2 is a block diagram for illustrating an example of a configuration of the management computer in the first embodiment of this invention.

FIG. 2 is a block diagram for illustrating an example of a configuration of the management computer 100. The management computer 100 is a computer including a processor 101, a memory 102, a storage device 103, an input device 104, an output device 105, and a network interface 106.

A program of the container orchestration 110 is loaded onto the memory 102 to be executed by the processor 101. The storage device 103 stores the container image files 60-1 to 60-$n$ distributed by the container orchestration 110 to the respective edge terminals 1.

The container image file 60-1 includes an application 61-1, an artificial intelligence (AI) model 62-1 by machine learning, and a device file monitoring module 63-1 which monitors the sensor 7-1 on the edge terminal 1-1. Similarly, the other container image files 60-2 to 60-$n$ include applications 61, AI models 62, and device file monitoring modules 63.

The applications 61 and the AI models 62 are combined with each other to suit a distribution destination, the type of the sensors 7 of the edge terminals 1, or the like. Combinations of the applications 61 and the AI models 62 for the container image files 60 may be set in advance by the administrator or another person, or the container image files 60 in which the applications 61 and the AI models 62 selected by the administrator or another person are combined may be generated in advance.

The input device 104 is configured from a keyboard and a mouse, a touch panel, or the like. The output device 105 is configured from a display and the like. The network interface 106 is coupled to the network 120 to hold communication to and from an external device.

The container orchestration 110 distributes one of the container image files 60 that is specified via the input device 104 to one of the edge terminals 1 that is specified. The container orchestration 110 may generate the container image files 60 by receiving combinations of one of the applications 61 and one of the AI models 62 via the input device 104.

Figure 3:
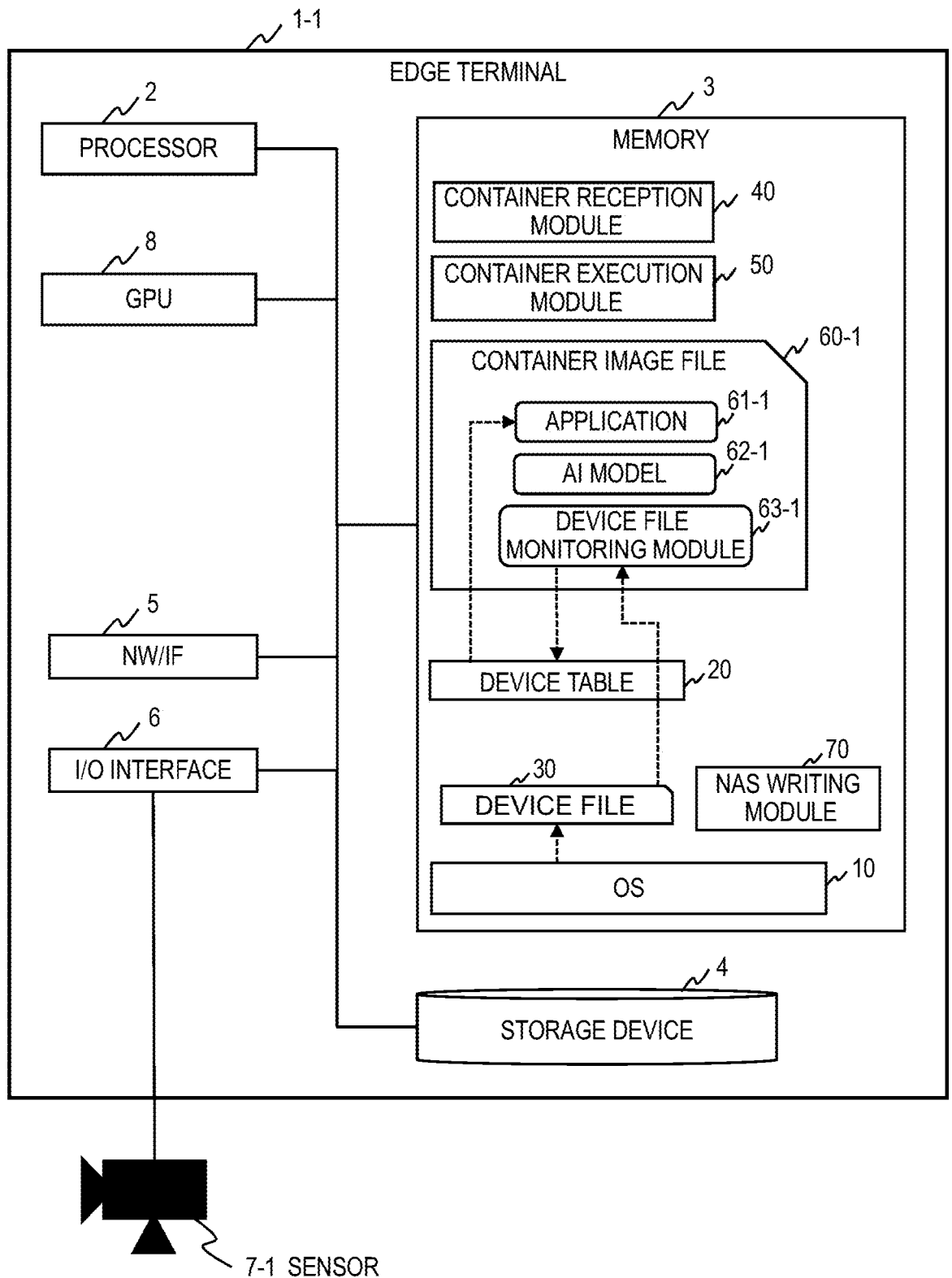
FIG. 3 is a block diagram for illustrating an example of a configuration of the edge terminal in the first embodiment of this invention.

FIG. 3 is a block diagram for illustrating an example of a configuration of the edge terminal 1-1. The edge terminal 1-1 is a computer including a processor 2, a memory 3, a storage device 4, a network interface 5, an I/O interface 6, and a graphics processing unit (GPU) 8. The sensor 7-1 is coupled to the I/O interface 6.

The edge terminal 1-1 can be configured from an inexpensive device using a System on a Chip (SoC), and the SoC can include the processor 2, the memory 3, the storage device 4, the network interface 5, the I/O interface 6, and the GPU 8.

A universal serial bus (USB) interface is adoptable as the I/O interface 6. With a USB interface adopted as the I/O interface 6, an inexpensive device such as a USB camera can be employed as the sensor 7-1. The sensor 7-1 is not limited to cameras, and a sensor suitable for a target of monitoring, such as detection of vibration (an acceleration), temperature, pressure, sound, or an object, is employable.

The adoption of a USB interface as the I/O interface 6 also facilitates detachment and attachment of the sensor 7-1, which eliminates requirement of a special skill to replace the sensor 7-1, and a running cost at a job site at which the edge terminal 1-1 is placed can accordingly be suppressed. The I/O interface 6 is not limited to wired connection, and wireless connection such as Bluetooth and Wi-Fi is employable.

An OS 10, a container reception module 40, a container execution module 50, and a NAS writing module 70 are loaded as programs onto the memory 3 to be executed by the processor 2. The memory 3 also stores the container image file 60-1 received by the container reception module 40, and a device table 20 which manages a device file 30 generated by the OS 10.

Once booting the container, the container execution module 50 first boots the device file monitoring module 63-1 from the container image file 60-1 received by the container reception module 40. The device file monitoring module 63-1 then executes the application 61-1 and the AI model 62-1, depending on a situation regarding whether the OS 10 successfully recognizes the sensor 7-1. The AI model 62-1 is executable by the GPU 8. In the first embodiment, a situation regarding generation of the device file 30 of the sensor 7-1 by the OS 10 is used as the situation monitored by the device file monitoring module 63-1 with respect to recognition of the sensor 7-1.

The NAS writing module 70 writes a processing result of the application 61-1 executed in the container in the processing results 210 of the NAS 200. The application 61-1 causes the AI model 62-1 to recognize sensing data detected by the sensor 7-1, and outputs, as a processing result, information including a result of the recognition.

After being booted or rebooted, the OS 10 recognizes the sensor 7-1, and generates, as the device file 30, device information including a physical identifier (physical ID) of the recognized sensor 7-1. When the device file 30 is generated, the device file monitoring module 63-1 registers information of this device file 30 in the device table 20.

The device file monitoring module 63-1 monitors for the device file 30 and, when detecting that the device file 30 has been generated, boots the application 61-1 to cause the application 61-1 to start predetermined information processing.

Once booted, the application 61-1 can access the sensor 7-1 and acquire the sensing data by reading information of the sensor 7-1 with reference to the device table 20. The application 61-1 may acquire the sensing data from the sensor 7-1 by directly acquiring the device file 30 and acquiring the physical identifier (physical ID) of the sensor 7-1.

The device file 30 is configured from a generic file name used by the OS 10, for example, "video 1." The file name of the device file 30 is registered in the device table 20 in a manner of, for example, "/dev/video0" or "/dev/video1."

On the edge terminal 1-1 in the first embodiment, when the container image file 60-1 is received after the OS 10 is booted, the container execution module 50 boots the container, and first boots the device file monitoring module 63-1 to monitor the situation regarding the generation of the device file 30 of the sensor 7-1, as described later.

The device file monitoring module 63-1 starts the application 61-1 after detecting that the OS 10 has generated the device file 30, to thereby accommodate fluctuations in the length of time until the generation of the device file which are caused by differences in type and manufacturer of the sensor 7-1 as in the related art. This enables the application 61-1 in the container to acquire information of the device file 30 without fail, and thus reliably process sensing data detected by the sensor 7-1.

The processor 2 operates as a functional module which provides a predetermined function by executing processing based on the program of each functional module. For example, the processor 2 functions as the container execution module 50 by executing processing based on a container execution module program. The same applies to other programs. In addition, the processor 2 also operates as a functional module which provides a function of each of a plurality of processes executed by each program. A computer and a computer system are used as a device and a system that include those functional modules.

The network interface 5 is coupled to the network 120 to hold communication to and from the management computer 100 and the NAS 200. The storage device 4 is configured from a non-volatile storage medium, and can hold the OS 10 and the programs of the container reception module 40 and the container execution module 50.

Figure 4:
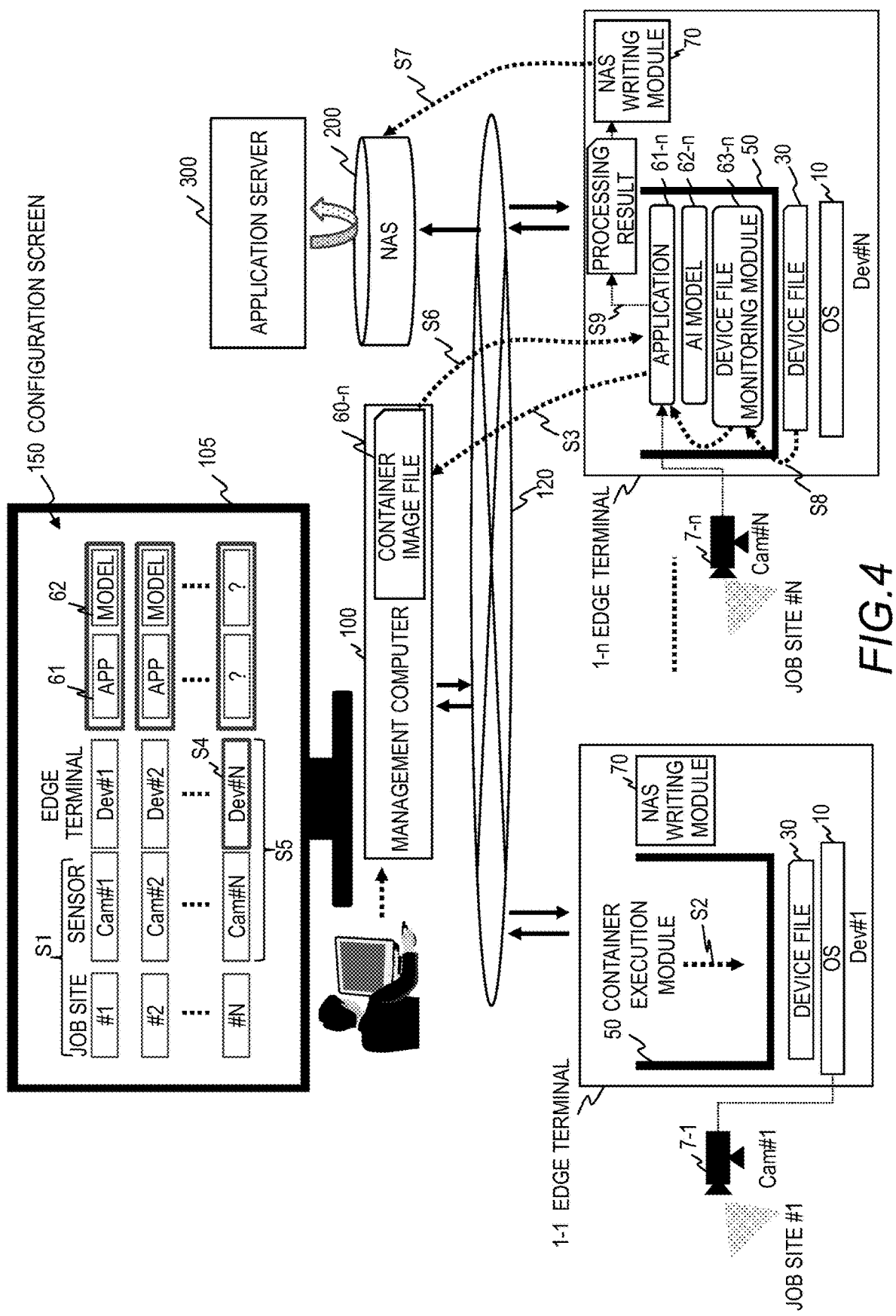
FIG. 4 is a diagram for illustrating an example of processing executed in the sensing system in the first embodiment of this invention.

FIG. 4 is a diagram for illustrating an example of processing executed in the sensing system. In the sensing system according to the first embodiment, a user of the management computer 100 first associates job sites to which the container image files 60 are to be distributed with sensors on a configuration screen 150 displayed on the output device 105 (Step S1).

Next, the container reception module 40 and the container execution module 50 are installed in each of the edge terminals 1 (Step S2). The edge terminals 1 are coupled to the network 120 to notify information of the edge terminals 1 to the management computer 100 (Step S3).

The management computer 100 receives the information (identifiers) of the edge terminals 1, and displays the identifiers in the form of "Dev #N" in an "edge terminal" field of the configuration screen 150 (Step S4). The user of the management computer 100 associates identifiers (Cam #N) of the sensors 7 with the identifiers (Dev #N) of the edge terminals 1 on the configuration screen 150 (Step S5).

The management computer 100 further selects the applications 61 and the AI models 62 to be executed on the edge terminals 1, and distributes the selected applications and AI models as the container image files 60 to the edge terminals 1 (Step S6). In the first embodiment, the applications 61 and the sensors 7 are associated on a one-to-one basis.

On each one of the edge terminals 1, the container reception module 40 receives one of the container image files 60, and then the OS 10 mounts the NAS 200 (Step S7). The container execution unit 50 boots the device file monitoring module 63 that is contained in the received container image file 60 from the received container image file to cause the device file monitoring module 63 to monitor whether there is the device file 30 (Step S8). When the device file 30 is generated, the device file monitoring module 63 stores information (a physical ID) of an associated one of the sensors 7 in the device table 20, and then boots the application 61 that is contained in the received container image file from the received container image file to cause the application 61 to start processing using the AI model 62 that is contained in the received container image file.

The application 61 acquires sensing data from the sensor 7 that is specified in the device table 20, and causes the AI model 62 to recognize the sensing data. The application 61 generates a processing result from a result of the recognition by the AI model 62, and writes the processing result in the NAS 200 via the NAS writing module 70 (Step S9).

Figure 5:
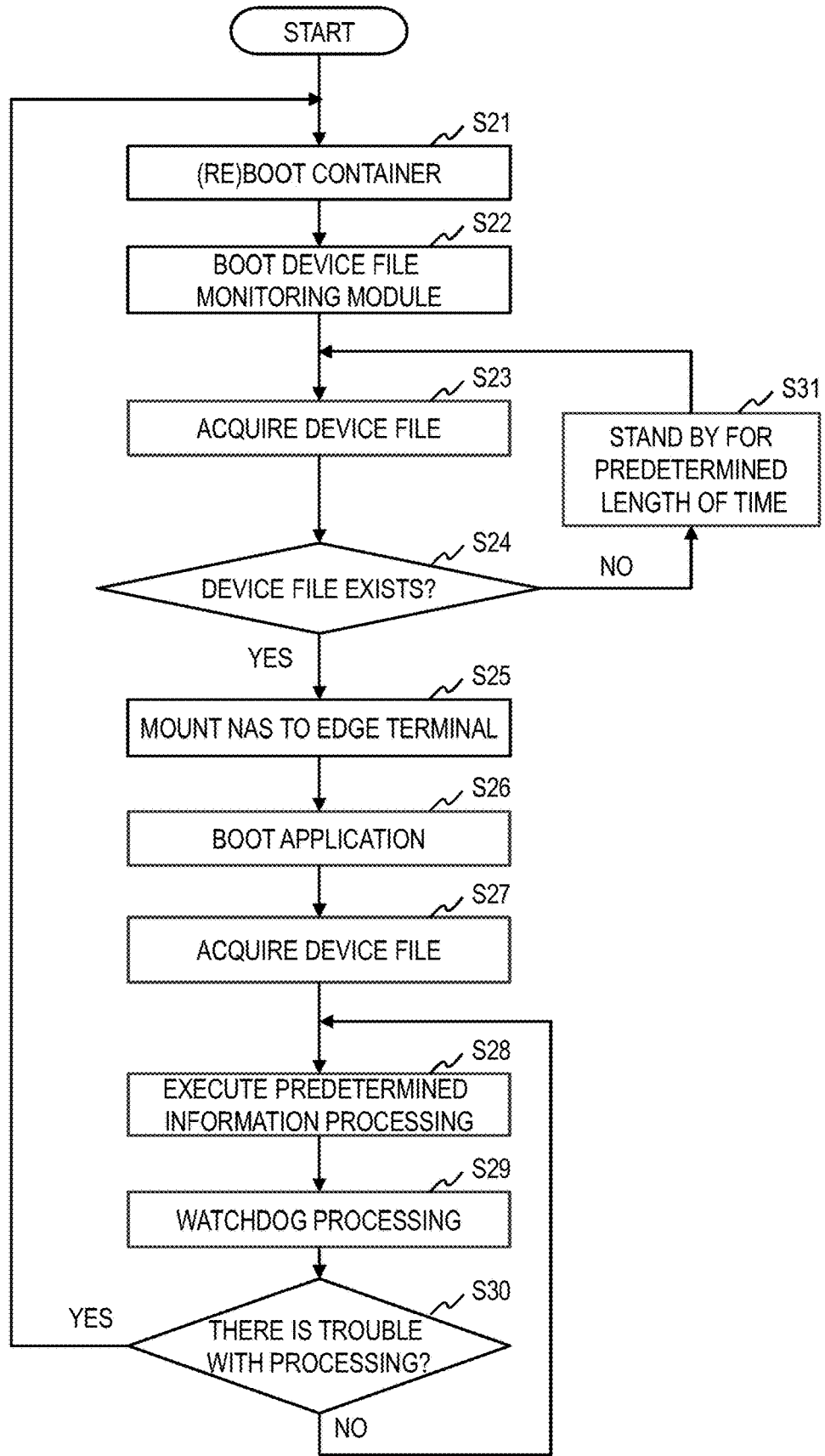
FIG. 5 is a flow chart for illustrating an example of processing executed on the edge terminals in the first embodiment of this invention.

FIG. 5 is a flow chart for illustrating an example of processing executed on the edge terminals 1. This processing is details of Step S6 and subsequent processing steps of FIG. 4.

On each one of the edge terminals 1, the container execution module 50 boots a container in order to execute the container image file 60 that has been received by the container reception module 40 (Step S21). The container execution module 50 boots the device file monitoring module 63 that is contained in the container image file 60 (Step S22).

The device file monitoring module 63 acquires the device file 30 generated by the OS 10 (Step S23). The device file monitoring module 63 determines whether there is the device file 30 (Step S24). When it is determined that there is the device file 30, the process proceeds to Step S25 and, otherwise, the process returns to Step S23 after a wait for elapse of a predetermined length of time in Step S31, to repeat the processing steps described above.

In Step S25, the OS 10 mounts the NAS 200 to the edge terminal 1. Next, the device file monitoring module 63 notifies the container execution unit 50, and boots the application 61 that is contained in the received container image file 60 from the received container image file to cause the application 61 to start processing using the AI model 62 that is contained in the received container image file (Step S26).

The application 61 acquires the information (physical ID) in the device table 20 (Step S27), acquires sensing data from one of the sensors 7 that is specified by the physical ID, and causes the AI model 62 to recognize the sensing data to generate a predetermined processing result (Step S28). The device file monitoring module 63 executes watchdog processing to verify that the sensing data has normally been acquired from the sensor 7 (Step S29). The watchdog processing may be executed by the application 61.

The device file monitoring module 63 determines, from a result of the watchdog processing, whether there is a trouble with the processing of the sensing data (Step S30). When it is determined that there is a trouble, the process returns to Step S21 in which the container execution module 50 is notified so that the container is rebooted. When it is determined that the processing of the sensing data is normally executed, on the other hand, the process returns to Step S28 to repeat the processing steps described above.

In a case of rebooting the container, the device file monitoring module 63 prohibits boot of the application 61 after the OS 10 of the edge terminal 1 is booted, until the device file 30 is generated. Stable operation is accordingly accomplished irrespective of the length of time until generation of the device file 30 which varies depending on the type and the manufacturer of the sensors 7.

Figure 6:
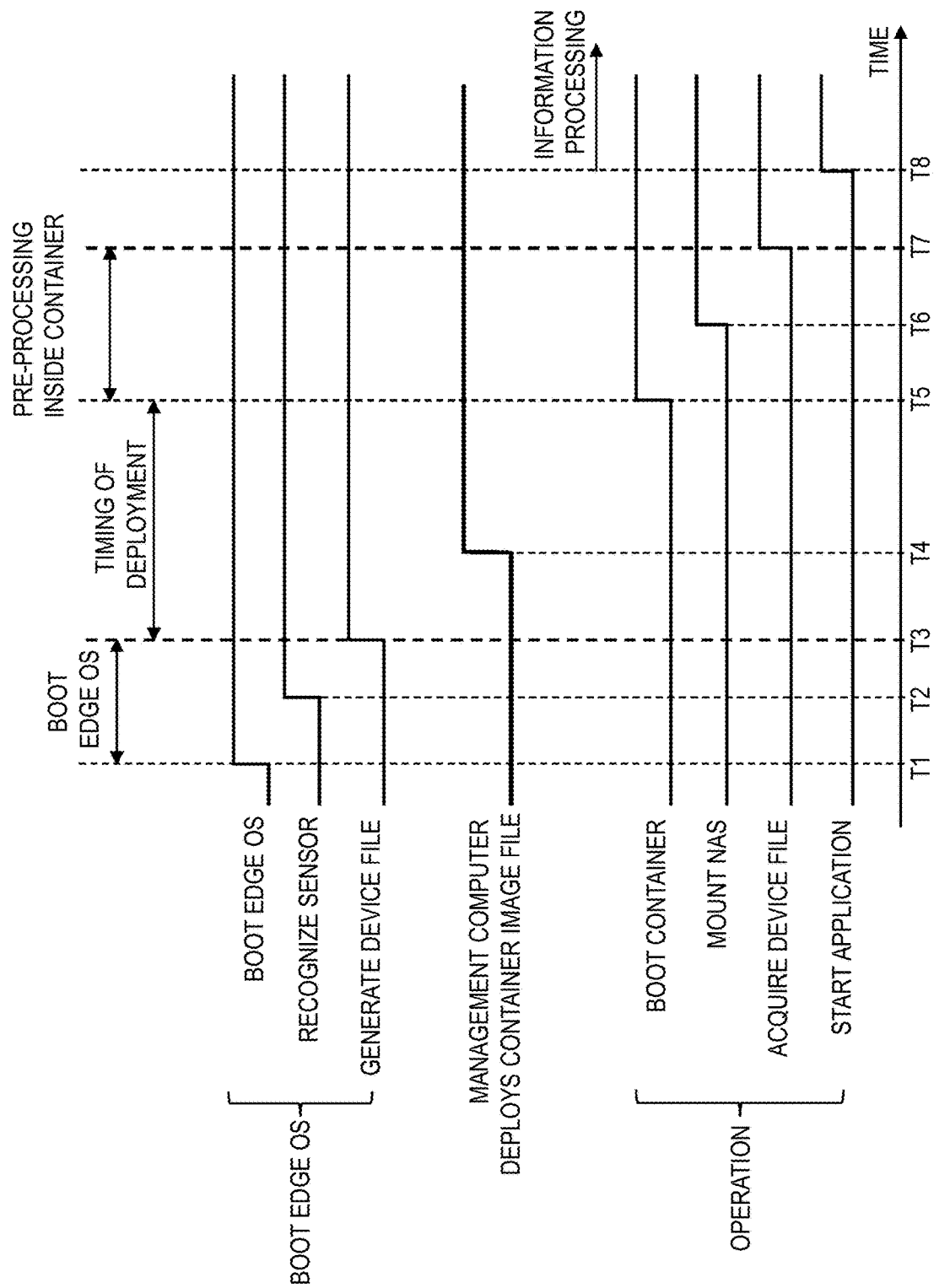
FIG. 6 is a time chart for illustrating an example of processing executed in the sensing system in the first embodiment of this invention.

FIG. 6 is a time chart for illustrating an example of processing executed in the sensing system. In the illustrated example, the edge terminals 1 are booted and receive distribution of the container image files 60, and then operation of the applications 61 is started.

At a time T1, the OS 10 of each one of the edge terminals 1 is booted. After being booted, at a time T2, the OS 10 recognizes one of the sensors 7 that is coupled to the I/O interface 6. The OS 10 generates the device file 30 based on a result of the recognition of the coupled sensor 7, and stores the device file 30 in the memory 3 (a time T3). The OS 10 also boots the container reception module 40 and the container execution module 50.

At a time T4, the management computer 100 distributes the container image files 60 to the edge terminals 1. The container reception module 40 of each one of the edge terminals 1 receives one of the container image files 60, and the container execution module 50 boots a container (a time T5). After the container is booted, the OS 10 mounts the NAS 200 (a time T6).

The container execution module 50 boots the device file monitoring module 63 that is contained in the received container image file 60 from the received container image file. The device file monitoring module 63 monitors whether the device file 30 is generated. The device file monitoring module 63 acquires the device file 30, determines that the device file 30 has been generated (a time T7), and then boots the application 61 that is contained in the received container image file 60 from the received container image file to cause the application 61 to start processing using the AI model 62 that is contained in the received container image file (a time T8)

As described above, the applications 61 are booted after the device file monitoring modules 63 are booted from the container image files 60 and generation of the device file 30 by the OS 10 is verified. A situation in which the applications 61 are booted before generation of the device file 30 and normal processing cannot consequently be executed as in the related art can thus be avoided without fail.

Figure 7:
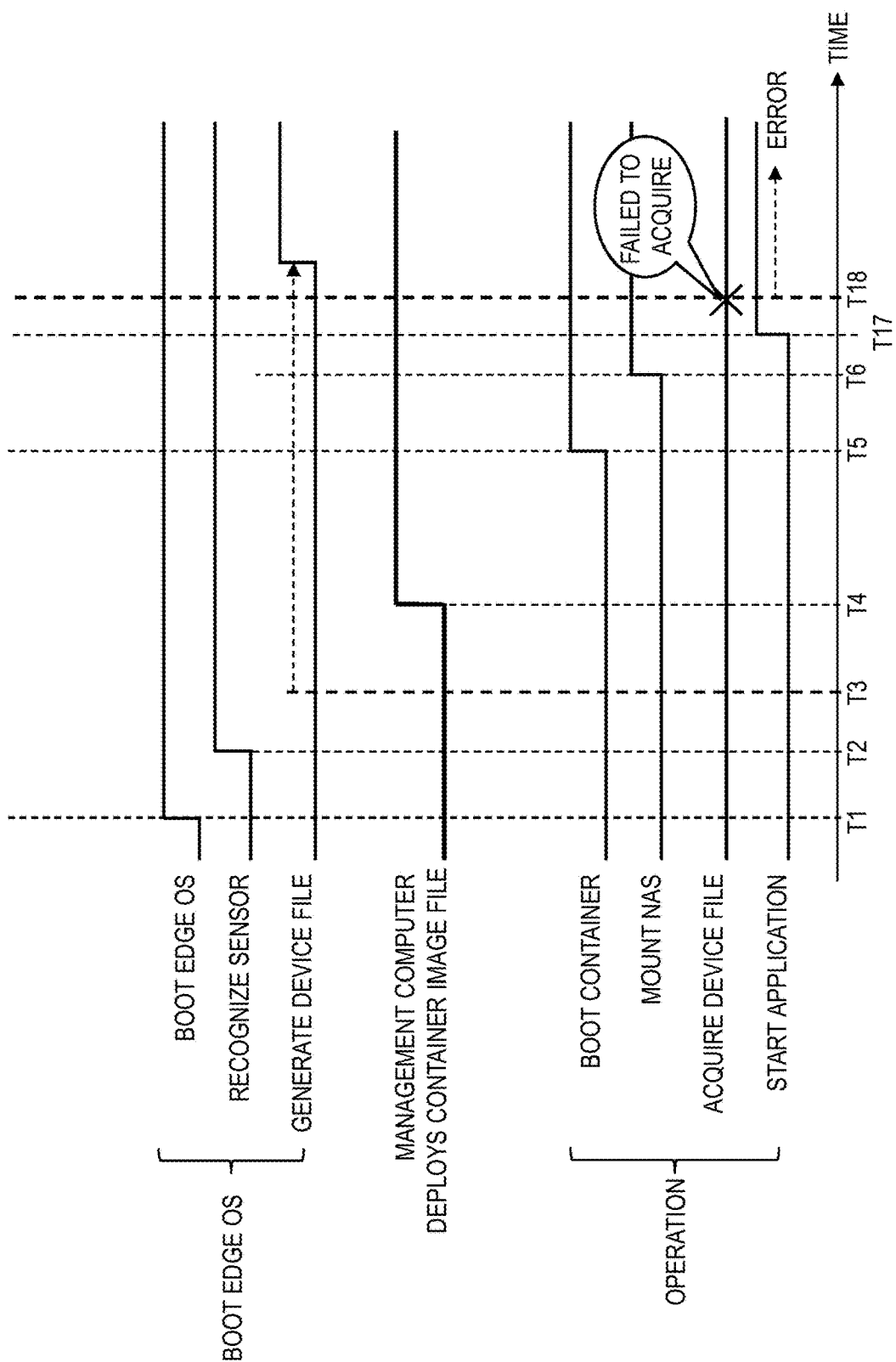
FIG. 7 is illustration of the related art in the form of a time chart for illustrating an example of processing executed in a sensing system in the first embodiment of this invention.

FIG. 7 is illustration of the related art in the form of a time chart for illustrating an example of processing executed in a sensing system. In the related art, the container image files 60 do not contain the device file monitoring modules 63 in this invention, and only contain the applications 61 and the AI models 62.

At the times T1 and T2, the related art is the same as the sensing system according to this invention which is illustrated in FIG. 6, but the OS 10 of each one of the edge terminals 1 is delayed in generating the device file 30 after the associated sensor 7 is recognized. In the illustrated example, the OS 10 generates the device file 30 past a time T18.

In a case in which the associated sensor 7 is a camera and the I/O interface 6 is a USB interface, the length of time from the booting of the OS 10 to the generation of the device file 30 varies from several seconds to a minute or so, depending on the manufacturer and model of the camera.

At the time T4, the management computer 100 distributes the container image files 60 that contain only the applications 61 and the AI models 62 to the edge terminals 1. The container reception module 40 of each one of the edge terminals 1 receives one of the container image files 60, and the container execution module 50 boots a container (the time T5). After the container is booted, the OS 10 mounts the NAS 200 (the time T6).

At a time T17, the container execution module 50 boots the application 61 that is contained in the received container image file 60 to cause the application 61 to start predetermined processing using the AI model 62 that is contained in the received container image file. The application 61 attempts to acquire the device file 30 at the time T18, but the OS 10 is yet to generate the device file 30.

Without the device file 30, the application 61 cannot recognize the associated sensor 7, and subsequent processing is processed as an error.

As described above, in the related art, when the sensors 7 are cameras coupled by USB connection, the length of time until the device file 30 is generated thus greatly varies depending on the camera's manufacturer and model, resulting in a situation in which none of the applications 61 on the edge terminals 1 can read the device file 30 and execute processing.

In the sensing system according to this invention, on the other hand, the container image files 60 contain the device file monitoring modules 63. On each one of the edge terminals 1, the device file monitoring module 63 that is contained in received one of the container image files 60 is booted first to monitor for the device file 30, and the application 61 that is contained in the received container image file is started at a time when the device file 30 is generated. Accordingly, with monitoring of the sensors 7 until generation of the device file 30 executed by the device file monitoring modules 63 on the side of the edge terminals 1, stable processing by the applications 61 and the AI models 62 is accomplished irrespective of differences in manufacturer and model of the sensors 7.

Figure 8:
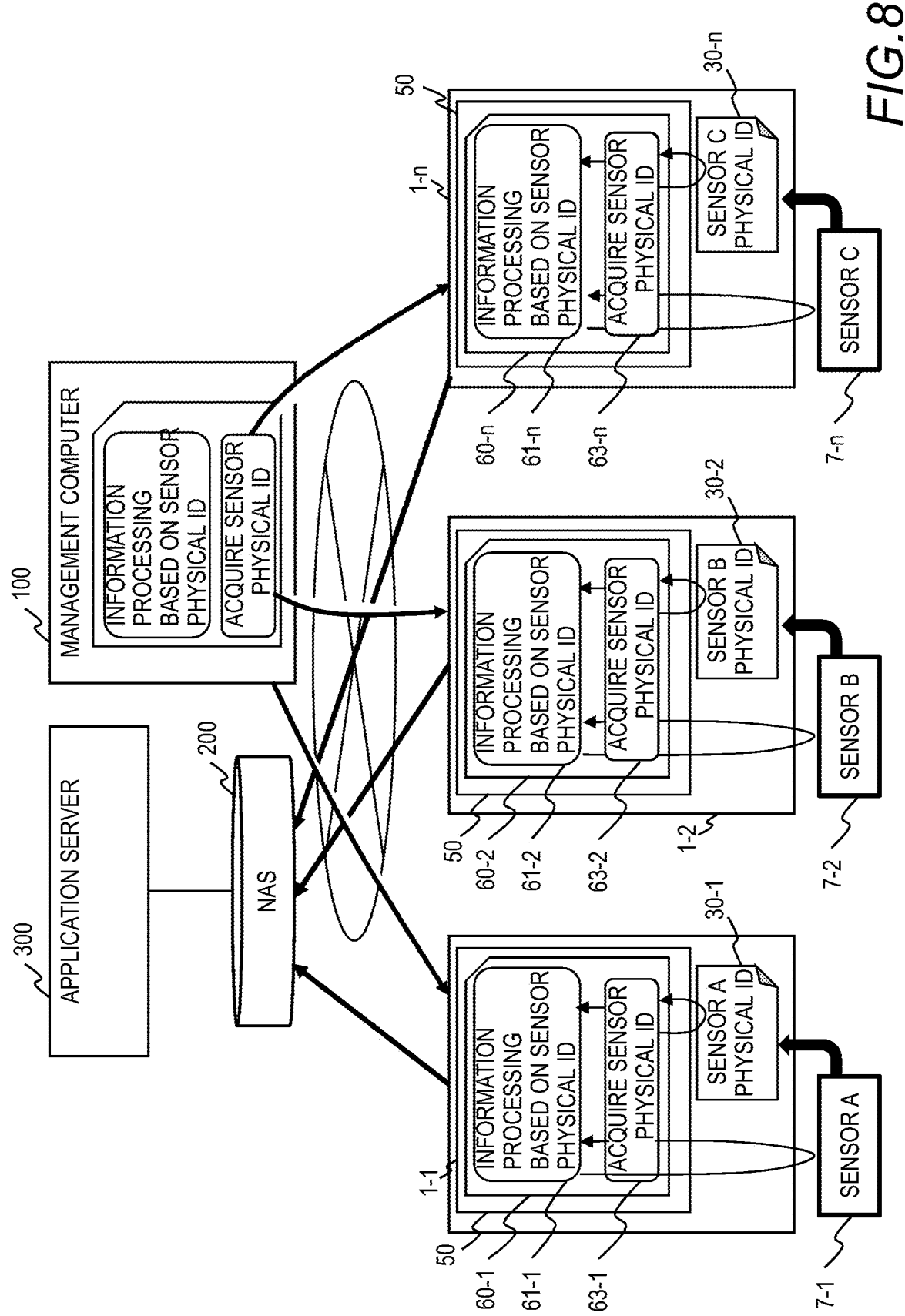
FIG. 8 is a diagram for illustrating an example of processing executed in the sensing system in the first embodiment of this invention.

FIG. 8 is a diagram for illustrating an example of processing executed in the sensing system. In the illustrated example, the applications 61-1, 61-2, and 61-n on the respective edge terminals 1-1, 1-2, and 1-n process data of different sensors A, B, and C.

The device file monitoring module 63-1 monitors for generation of a device file 30-1 of the sensor A (7-1) by the OS 10 and, when the device file 30-1 is generated, acquires a physical ID of the sensor A (7-1).

Once the device file 30-1 is generated, the device file monitoring module 63-1 registers the physical ID of the sensor 7-1 in the device table 20, and then boots the application 61-1. The application 61-1 acquires the physical ID of the sensor 7-1 from the device table 20 to access the sensor 7-1 and execute predetermined processing.

Figure 9:
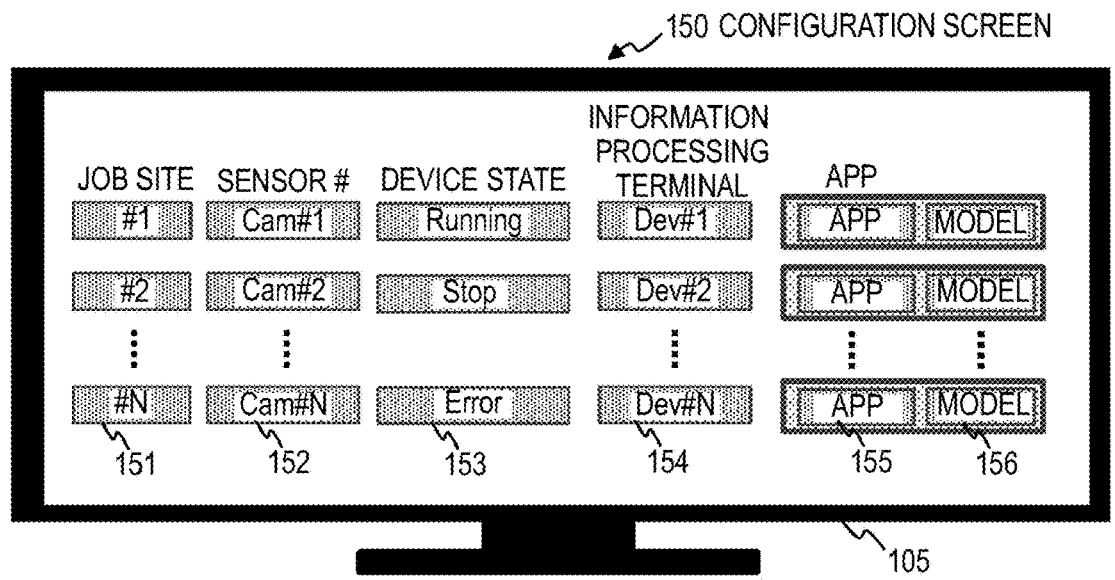
FIG. 9 is a diagram for illustrating an example of the configuration screen 150 to be displayed on the management computer in the first embodiment of this invention.

FIG. 9 is a diagram for illustrating an example of the configuration screen 150 to be displayed on the management computer 100. On the configuration screen 150 displayed on the output device 105, the user of the management computer 100 can separately manage a configuration for each of the edge terminals 1 to which the container image files 60 are distributed. The configuration screen 150 may be generated by the container orchestration 110, or by another management program.

The configuration screen 150 includes an area for a job site 151 to display identifiers (or names) of places (factories or job sites) in which the sensors 7 and the edge terminals 1 are installed, an area for a sensor #152 to display identifiers (or names) of the sensors 7, an area for a device state 153 to display states of the sensors 7, an area for an information processing terminal 154 to display identifiers of the edge terminals 1, an area for an app 155 to display identifiers (or names) of the applications 61, and an area for a model 156 to display identifiers (or names) of the AI models 62.

The user of the management computer 100 can set association of the job site 151 with the sensor #152 and the information processing terminal 154, a combination of the app 155 and the model 156, and the like on the configuration screen 150.

Figure 10:
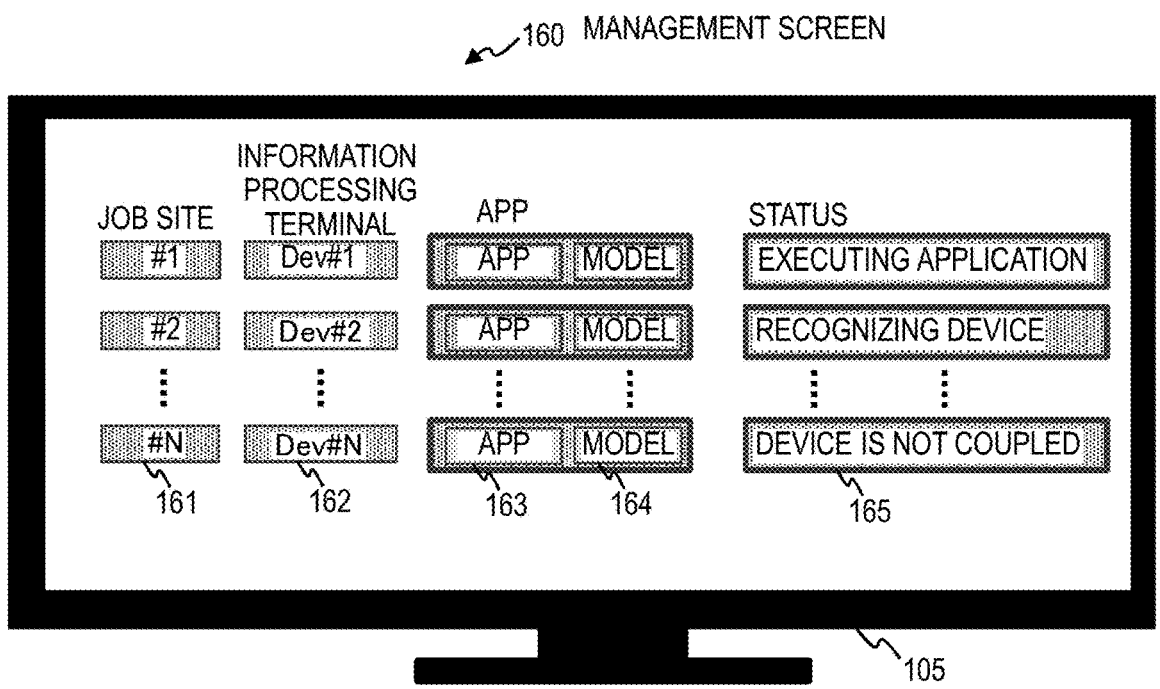
FIG. 10 is a diagram for illustrating an example of a management screen 160 to be displayed on the management computer in the first embodiment of this invention.

FIG. 10 is a diagram for illustrating an example of a management screen 160 to be displayed on the management computer 100. The management screen 160 displayed on the output device 105 of the management computer 100 displays operation statuses of the edge terminals 1.

The management screen 160 includes an area for a job site 161 to display identifiers (or names) of places (factories or job sites) in which the sensors 7 and the edge terminals 1 are installed, an area for an information processing terminal 162 to display identifiers (or names) of the edge terminals 1, an area for an app 163 to display identifiers (or names) of the applications 61, an area for a model 164 to display identifiers (or names) of the AI models 62, and an area for a status 165 to display operation statuses of the applications 61. The area for the status 165 displays the states of the applications 61 or the sensors 7 ("device" in FIG. 10).

The sensing system according to the first embodiment can thus offload state management of the sensors 7 coupled to the edge terminals 1 to the side of the edge terminals 1 by including the device file monitoring modules 63 in the container image files 60. This frees the management computer 100 of management of the sensors on the side of the edge terminals 1, and accordingly decreases the cost of introducing and running the sensing system.

The cost of introducing the sensing system can be decreased also by employing a USB interface as the I/O interface 6 and thereby enabling adoption of inexpensive sensors for the sensors 7. In addition, the device file monitoring modules 63 contained in the container image files 60 boot the applications 61 after timing of completing generation of the device file 30, to thereby enable each of the applications 61 to read the device file 30 without fail, irrespective of the manufacturer and the type of the sensors 7, and stable operation is thus accomplished.

The first embodiment described above deals with an example in which the device file 30 is registered in the device table 20, but the device file 30 may be read directly by each of the applications 61.

The first embodiment described above deals with an example in which the AI models 62 recognize sensing data acquired by the applications 61 from the sensors 7. However, this invention is not limited thereto. The AI models 62 are not an indispensable component of the container image files 60, and processing results obtained by applying predetermined processing such as statistical processing to the sensing data by the applications 61 may be transmitted to the NAS 200.

The first embodiment described above deals with an example in which a USB interface is employed as the I/O interface 6 and cameras are employed as the sensors 7 that are detachable. However, this invention is not limited thereto, and sensors may be mounted on chip substrates of the edge terminals 1 using SoC chips.

Second Embodiment

Figure 11:
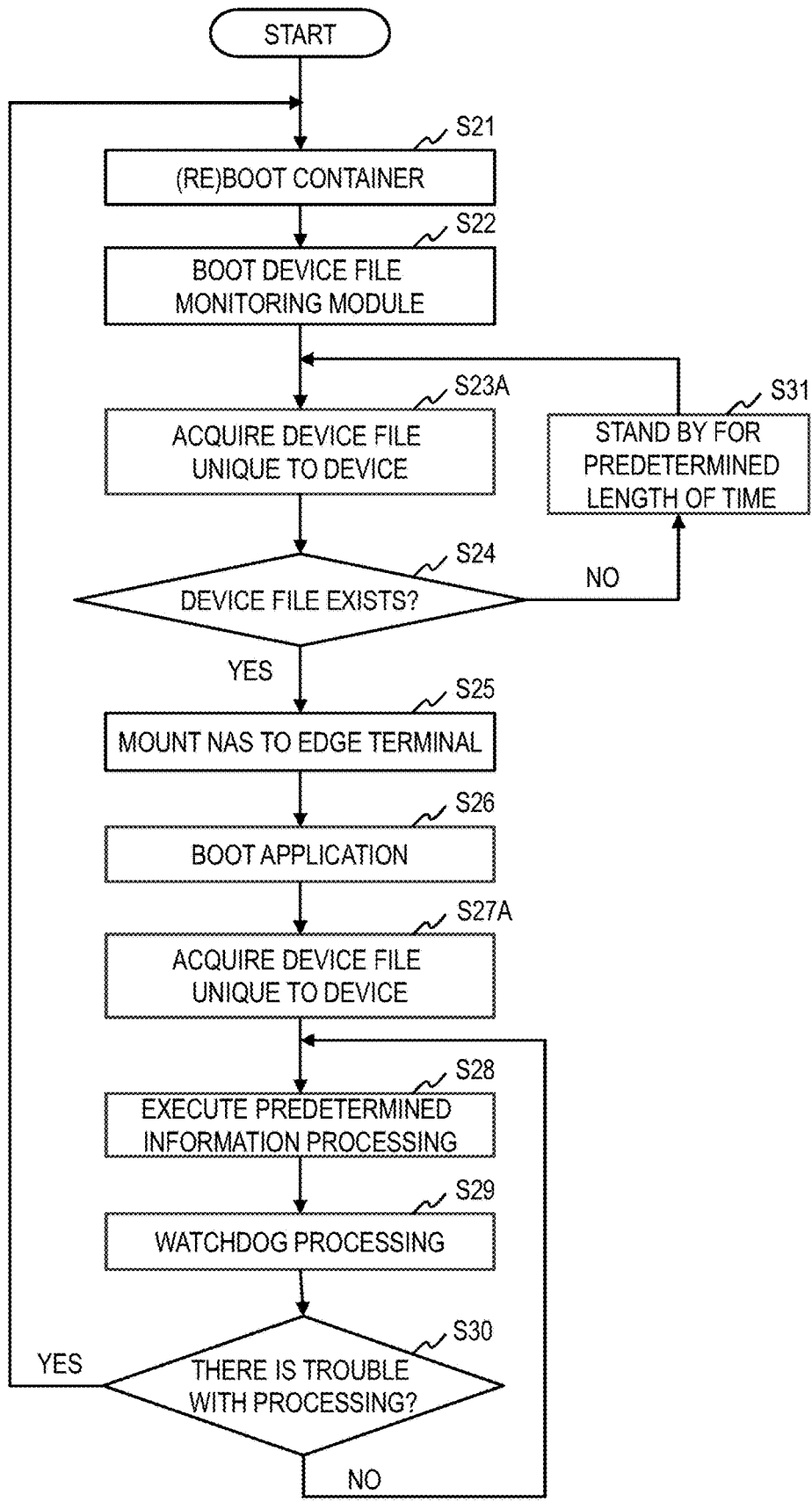
FIG. 11 is illustration of a second embodiment of this invention in the form of a flow chart for illustrating an example of processing executed on the edge terminals.

FIG. 11 is illustration of a second embodiment of this invention in the form of a flow chart for illustrating an example of processing executed on the edge terminals 1. A difference from the flow chart of FIG. 5 described in the first embodiment is that Step S23 and Step S27 are changed to Step S23A and Step S27A, respectively.

In Step S27A, the device file monitoring module 63 acquires information (for example, a physical ID) unique to the associated sensor 7 from the device file 30, and registers the information in the device table 20. In Step S27A, the application 61 acquires the physical ID unique to the associated sensor 7 from the device table 20, recognizes the associated sensor 7 with the physical ID, and executes predetermined processing. The rest of the configuration is the same as the configuration in the first embodiment described above.

The first embodiment described above deals with an example in which the OS 10 gives the device file 30 a generic name, for example, "/dev/video0" or "/dev/video1," and such a generic name is used. However, more than one device file 30 is generated for each one of the sensors 7 depending on the type of the sensors 7 (cameras), a version of the OS 10, or the like.

The program of the applications 61, on the other hand, can process specification of only one sensor out of the sensors 7. In a case in which "/dev/video0" is specified by the device file 30 and "/dev/video1" is generated as another device file 30, the processing of the applications 61 is affected.

It is accordingly desired to use a device file that indicates information unique to a device generated in a path of "/dev/v4I/by-id/." However, the device file 30 has a file name varying from one sensor to another among the sensors 7, and write in the applications 61 inside the container image files 60 is consequently poor in versatility.

The second embodiment addresses this by utilizing the device table 20. On each one of the edge terminals 1, the device file monitoring module 63 that is located on the edge terminal 1 acquires the unique information of one of the sensors 7 that is coupled to the I/O interface 6, and writes the unique information of the coupled sensor 7 in the device table 20.

Inside the container, the unique information of the coupled sensor 7 that is written in the device table 20 is acquired, and the application 61 that is contained in the container executes predetermined information processing based on the unique information of the coupled sensor 7 that is written in the device table 20. This enables the application 61 to recognize the coupled sensor 7 without fail even when more than one device file 30 is generated for each of the sensors 7, or when the device file 30 has a file name varying from one sensor to another among the sensors 7.

In the second embodiment described above, a cost of managing the sensors 7 on the side of the edge terminals 1 is reduced, and information processing by the applications 61 can be executed smoothly.

Figure 12:
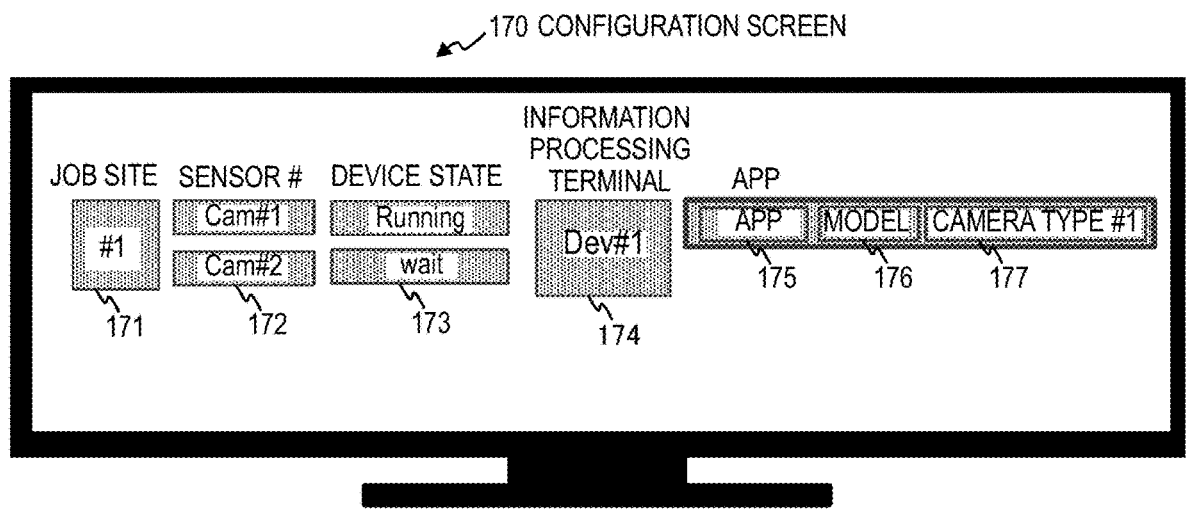
FIG. 12 is a diagram for illustrating a configuration screen, which is another example of the configuration screen displayed on the management computer in the second embodiment of this invention.
Figure 13:
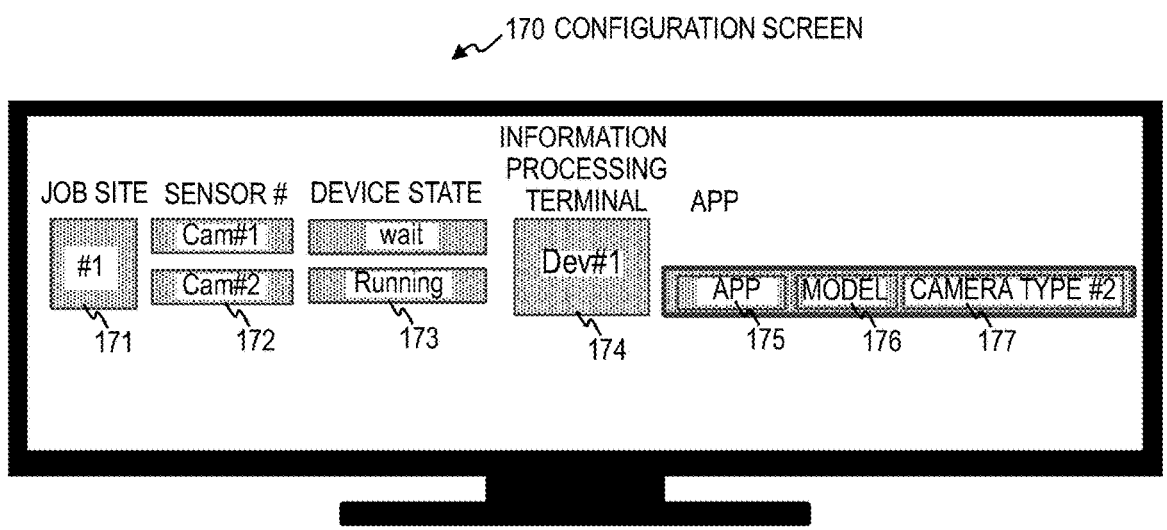
FIG. 13 is a diagram for illustrating a configuration screen, which is another example of the configuration screen displayed on the management computer in the second embodiment of this invention.

FIG. 12 and FIG. 13 are diagrams for illustrating a configuration screen 170, which is another example of the configuration screen displayed on the management computer 100. In the illustrated example, a plurality of sensors 7 are coupled to one of the edge terminals 1, and a sensor to be processed is switched from one of the sensors 7 to another of the sensors 7 in response to a command from the management computer 100.

The configuration screen 170 includes an area for a job site 171 to display identifiers (or names) of a place (a factory or a job site) in which the sensors 7 and the one of the edge terminals 1 are installed, an area for a sensor #172 to display identifiers (or names) of the sensors 7, an area for a device state 173 to display states of the sensors 7, an area for an information processing terminal 174 to display an identifier of the edge terminal 1, an area for an app 175 to display an identifier (or a name) of the application 61 that is located on the edge terminal 1, an area for a model 176 to display an identifier (or a name) of the AI model 62 that is located on the edge terminal 1, and an area for a camera type 177 to display the type of one of the sensors 7 that is used.

Two sensors (Cam #1 and Cam #2) are coupled to the edge terminal 1 that is illustrated in FIG. 12 and FIG. 13 ("Dev #1" in FIG. 12 and FIG. 13). One of the sensors 7 that is "Cam #1" is in operation in FIG. 12, and one of the sensors 7 that is "Cam #2" is in operation in FIG. 13.

When switching from one of the plurality of sensors 7 to another of the plurality of sensors 7, the user of the management computer 100 specifies, on the configuration screen 170, "Cam #2" as the camera type 177 to be used, selects one of the applications 61 and one of the AI models 62 to be distributed as an application and an AI model suitable for the sensor 7 that is the switched-to sensor, and commands the edge terminal 1 to reboot.

After the edge terminal 1 is rebooted, the management computer 100 distributes one of the container image files 60 that is associated with "Cam #2," switch the sensors 7, and can then execute processing of the application 61 that is contained in the redistributed container image file 60. The application 61 that is contained in the redistributed container image file 60 acquires information about "Cam #2" from pieces of information unique to the sensors 7 in the device table 20, to thereby accomplish smooth switching from one of the plurality of sensors 7 to another of the plurality of sensors 7.

Conclusion

As described above, each one of the edge terminals 1 according to the embodiments may have the following configurations.

(1) There is provided an information processing terminal (edge terminal 1) including a processor (2), a memory (3), a communication unit (network interface 5), and a sensor (7).

The information processing terminal includes: a container reception module (40) configured to receive a container image (container image file 60) via the communication unit (5); and a container execution module (50) configured to boot, when the container image (60) is received, a container and cause the container to execute an application (61) contained in the container image (60). The container is configured to boot the application (61) based on a recognition situation about whether the sensor (7) is recognized, and the application (61) is configured to execute predetermined processing for sensing data acquired from the sensor (7).

With the configuration described above, it is possible to offload state management of the sensors 7 coupled to the edge terminals 1 to the side of the edge terminals 1. This frees the management computer 100 of management of the sensors on the side of the edge terminals 1, and accordingly decreases the cost of introducing and running the sensing system.

(2) In the information processing terminal according to Item (1), the recognition situation of the sensor (7) is a generation situation about whether a device file (30) including a physical identifier of the sensor (7) is generated.

With the configuration described above, the application 61 that is contained in the received container image file is booted based on the generation situation of the device file 30 including the physical identifier of the sensor 7, to thereby enable the application 61 to read the device file 30. Stable operation is thus accomplished.

(3) In the information processing terminal according to Item (2), the container image (60) contains a device file monitoring module (63) configured to monitor for the device file (30), and the container is configured to boot the device file monitoring module (63) and, with acquisition of the device file (30) of the sensor (7) by the device file monitoring module (63) as a trigger, execute the application (61).

With the configuration described above, the device file monitoring module 63 that is contained in the received container image file 60 boots the application 61 after timing of completing the generation of the device file 30, to thereby accommodate fluctuations in the length of time until the generation of the device file 30, irrespective of the manufacturer and the type of the sensor 7, and enable the application 61 to read the device file 30 without fail. Stable operation is thus accomplished.

(4) In the information processing terminal according to Item (3), the device file monitoring module (63) is configured to boot the application (61) after acquiring the device file (30) and registering, in a device table (20), the physical identifier of the sensor (7) that is written in the device file (30), and the application (61) is configured to acquire the physical identifier registered in the device table (20), access the sensor (7), acquire the sensing data from the sensor (7), and execute the predetermined processing for the sensing data.

With the configuration described above, inside the container, the unique information of the sensor 7 that is written in the device table 20 is acquired, and the application 61 that is contained in the container executes predetermined information processing based on the unique information of the sensor 7 that is written in the device table 20. This enables the application 61 to recognize the sensor 7 without fail even when more than one device file 30 is generated for each of the sensors 7, or when the device file 30 has a file name varying from one sensor to another among the sensors 7.

(5) The information processing terminal according to Item (1) further includes an I/O interface (6) to and from which the sensor (7) is attachable and detachable.

With the configuration described above, the cost of introducing the sensing system can be decreased also by employing a USB interface as the I/O interface 6 and thereby enabling adoption of inexpensive sensors for the sensors 7.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

The invention claimed is:

1. An information processing terminal, comprising:
   a processor;
   a memory;
   a communication unit;
   a sensor;
   a container reception module configured to receive a container image via the communication unit,
      wherein the container image contains a device file monitoring module configured to monitor for a device file including a physical identifier of the sensor; and
   a container execution module configured to boot, when the container image is received, a container and cause the container to execute an application contained in the container image,
   the application configured to execute predetermined processing for sensing data acquired from the sensor,
   the container configured to
      boot the application based on a recognition situation about whether the sensor is recognized, and the recognition situation of the sensor is a generation situation about whether the device file is generated,
      boot the device file monitoring module, and
      with acquisition of the device file of the sensor by the device file monitoring module as a trigger, execute the application,
   the application configured to acquire the physical identifier registered in a device table, access the sensor, acquire sensing data from the sensor, and execute the predetermined processing for the sensing data.

2. The information processing terminal according to claim 1, further comprising an I/O interface to and from which the sensor is attachable and detachable.

3. A sensing system, comprising:
   an information processing terminal including a processor, a memory, a communication unit, and a sensor; and
   a management computer including a processor, a memory, and a communication unit, the management computer being configured to manage the information processing terminal,
   the management computer including a container management module configured to manage a container image to be distributed to the information processing terminal, and distribute the container image containing an application to be executed on the information processing terminal,
      wherein the application is configured to execute predetermined processing for sensing data acquired from the sensor
   the information processing terminal including:
      a container reception module configured to receive the container image via the communication unit, and the container image contains a device file monitoring module configured to monitor for a device file including a physical identifier of the sensor; and
      a container execution module configured to boot, when the container image is received, a container and cause the container to execute the application contained in the container image, the container configured to
> boot the application based on a recognition situation about whether the sensor is recognized, and the recognition situation of the sensor is a generation situation about whether the device file is generated,
> boot the device file monitoring module, and
> with acquisition of the device file of the sensor by the device file monitoring module as a trigger, execute the application, the device file monitoring module configured to boot the application after acquiring the device file and registering, in a device table, the physical identifier of the sensor that is written in the device file, and the application configured to acquire the physical identifier registered in the device table, access the sensor, acquire the sensing data from the sensor, and execute the predetermined processing for the sensing data.

4. The sensing system according to claim 3, wherein the container management module is configured to:
> output a configuration screen for selecting, from a plurality of information processing terminals, an information processing terminal on which processing of the sensor is to be executed, and for specifying one of a plurality of applications that executes the processing of the sensor, creating a specified information processing terminal and a specified application;
> receive a combination of the specified information processing terminal and the specified application that executes the processing of the sensor which is specified on the configuration screen; and
> distribute, to the specified information processing terminal, the container image containing the specified application.

5. The sensing system according to claim 3, wherein the container management module is configured to acquire, from the information processing terminal, operation statuses of the sensor and the application, and output a management screen on which the operation statuses of the sensor and the application are displayed for each of a plurality of information processing terminals.

* * * * *